United States Patent
Wei et al.

(10) Patent No.: US 7,291,695 B2
(45) Date of Patent: Nov. 6, 2007

(54) STABLE WET STRENGTH RESIN

(75) Inventors: Mingli Wei, Naperville, IL (US); Vladimir A. Grigoriev, Chicago, IL (US); Gary S. Furman, Jr., St. Charles, IL (US)

(73) Assignee: Nalco Company, Naperville, IL (US)

( * ) Notice: Subject to any disclaimer, the term of this patent is extended or adjusted under 35 U.S.C. 154(b) by 576 days.

(21) Appl. No.: 10/818,269

(22) Filed: Apr. 5, 2004

(65) Prior Publication Data
US 2005/0222377 A1  Oct. 6, 2005

(51) Int. Cl.
*C08F 6/00* (2006.01)
(52) U.S. Cl. ............... 528/480; 162/164.6; 524/608; 528/310
(58) Field of Classification Search ......... 162/164.6; 524/608; 528/310
See application file for complete search history.

(56) References Cited

U.S. PATENT DOCUMENTS

| 3,197,472 A | 7/1965 | Schmaiz |
| 4,853,431 A * | 8/1989 | Miller ............. 524/608 |

FOREIGN PATENT DOCUMENTS

| EP | 0320121 A2 | 6/1989 |
| EP | 0320121 A3 | 6/1989 |

* cited by examiner

Primary Examiner—Terressa Boykin
(74) Attorney, Agent, or Firm—Michael B. Martin; Thomas M. Breininger

(57) ABSTRACT

A method of stabilizing an aqueous solution of polyaminoamide-epichlorohydrin resin comprising adjusting the pH of the solution to less than about 3 with strong acid and then adding to the solution a weak acid in a mole ratio of total protons available from the weak acid to total protons available from the strong acid of about 0.05 to about 2.

18 Claims, 1 Drawing Sheet

STABLE WET STRENGTH RESIN

TECHNICAL FIELD

This invention is a method of stabilizing polyaminoamide-epichlorohydrin wet strength resins, especially at high solid levels. More specifically, the method involves adding a small amount of weak acid such as acetic acid, formic acid, and the like into the finished wet strength resin.

BACKGROUND OF THE INVENTION

Wet strength is the ability of paper to retain its integrity upon wetting. This property is critical for tissue, towel, napkin and other consumer products. A typical wet strength product in the marketplace is polyaminoamide-epichlorohydrin resin (PAE resin).

As polyaminoamide-epichlorohydrin resin is an active crosslinker, viscosity can build up and eventually gelling will occur, especially at conditions of prolonged storage time and high temperatures. The pH of final PAE resins is normally adjusted for suitable storage stability, but the higher the solid content, the lower the pH at which the resin must be maintained. However, there is a limit to which the pH value can be lowered since the PAE resin can be hydrolyzed once the pH is below a certain level.

Procedures for making PAE resins are well known in the literature. A polyaminoamide backbone is first prepared by reacting a polyalkylene polyamine and an aliphatic dicarboxylic acid or dicarboxylic acid derivative. A polyaminoamide made from diethylenetriamine and adipic acid or esters of dicarboxylic acid derivatives is most common. The polyaminoamide then reacts with epichlorohydrin in an aqueous solution. The product is diluted and neutralized to the desired solid content and pH range. Nearly all references involve the neutralization of the product with strong mineral acid such as sulfuric acid and hydrochloric acid to a pH below 3.0. The final products are kept at 10-25% concentration to avoid gellation.

A higher solid content is always desirable in the final product due to its lower cost of manufacturing, storage, transportation and application. But due to the decreased stability at higher solid content, wet strength resins are mostly kept at lower concentrations while the pH is adjusted below 3.0 with strong acid such as sulfuric acid and hydrochloric acid to avoid gellation. Two popular wet strength resins on the market are 12.5% KYMENE® 557 series from Hercules Incorporated, Wilmington, Del. and 25% AmRes® 25HP from Georgia-Pacific Resins Inc., Atlanta, Ga. Synthesis of a stable PAE resin of high solid content has remained a challenging task.

A process for stabilizing an aqueous polyamide-epichlorohydrin solution by adding a mixture of a weak acid and a strong acid to the aqueous solution is disclosed in EP0320121. In this process the majority of the acid is the weak acid (preferably formic acid). The preferred mole ratio of weak acid protons to strong acid protons (sulfuric acid) is about 3:1.

U.S. Pat. No. 3,197,427 discloses a process for stabilizing an aqueous polyamide-epichlorihydrin solution in which the pH of the solution is first adjusted to 3-4 with formic acid and is then adjusted to 2-3 with sulfuric acid.

SUMMARY OF THE INVENTION

We have discovered that when pH adjustment is done with a strong acid and a small (2% or less based on product) amount of a weak acid is formulated into the final PAE resin product, the stability of the resin is greatly enhanced. A product having 35% polymer solids prepared as described herein exhibits excellent wet strength performance and enhanced gelling stability against industrial benchmark products.

Accordingly, this invention is a method of stabilizing an aqueous solution of polyaminoamide-epichlorohydrin resin comprising adjusting the pH of the solution to less than about 3 with strong acid and then adding to the solution weak acid in a mole ratio of total protons available from the weak acid to total protons available from the strong acid of about 0.05 to about 2.

DETAILED DESCRIPTION OF THE INVENTION

Figure 1:
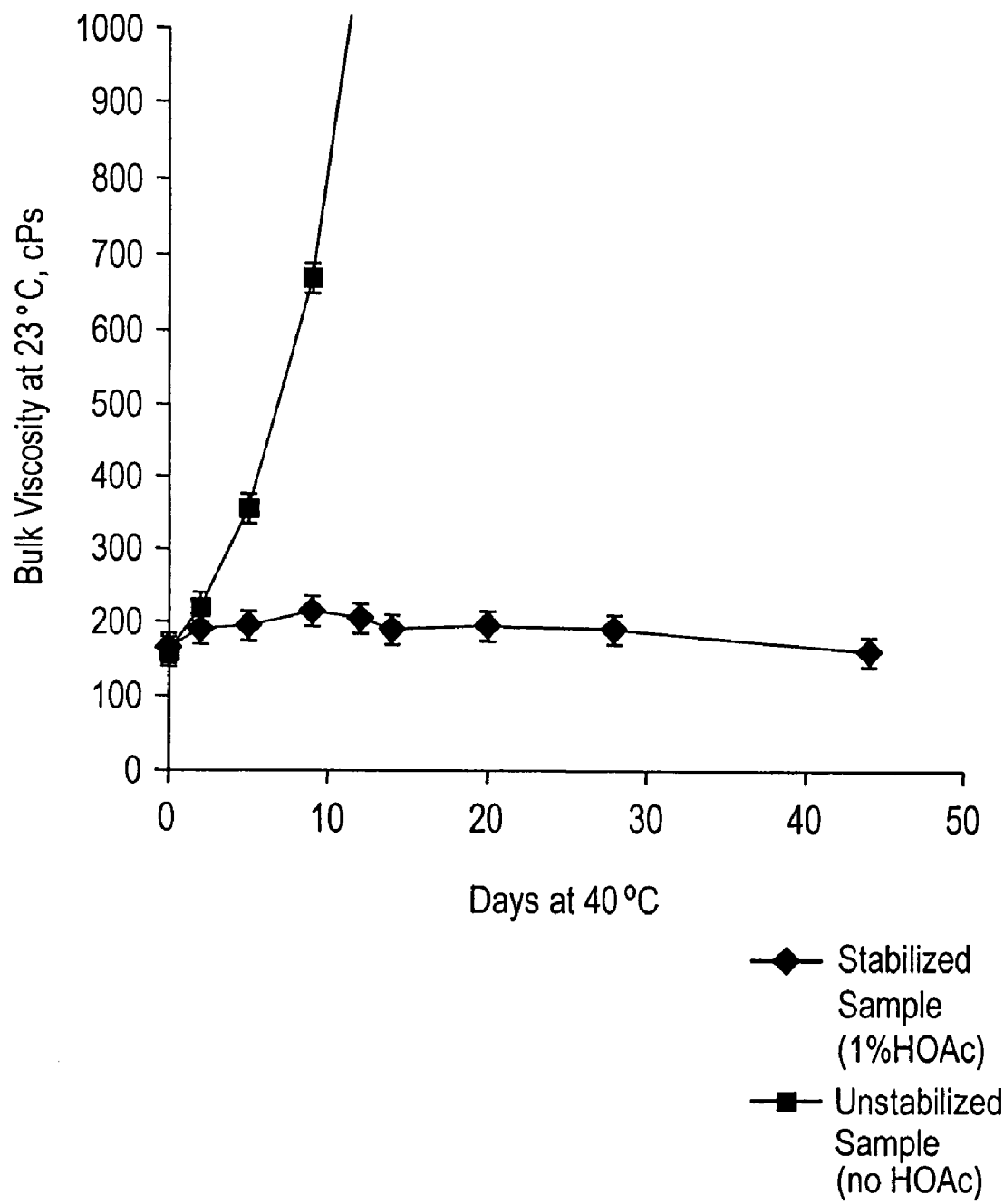
FIG. 1 is a plot of bulk viscosity vs. days at 40° C. for a representative stabilized polyaminoamide-epichlorohydrin resin prepared according to the method of this invention and an unstabilized sample.

Polyaminoamide-epichlorohydrin resins which can be stabilized according to this invention are water soluble, cationic thermosetting resins typically prepared by reacting one or more polyalkylene polyamines containing secondary amine groups and one or more dicarboxylic acid derivatives to form a polyaminoamide and then reacting the polyaminoamide with epichlorohydrin to form the polyaminoamide-epichlorohydrin resin.

The polyaminoamide backbone of the polyaminoamide-epichlorohydrin resin is generally made from the condensation polymerization of one or more organic dicarboxylic acid derivatives and one or more polyalkylene polyamines under conditions suitable for forming long-chain polyamides, preferably at temperatures higher than about 130° C. for several hours with removal of water or alcohol byproducts. The resulting polyaminoamide typically has molecular weight of about 500 to about 500,000 Daltons and a polymer Brookfield viscosity higher than about 100 cps for a 50% solution at 25° C. Water is added at end of the polymerization to make an aqueous polymer solution.

Generally, a sufficient amount of organic acid derivative to react with substantially all of the primary amino groups but insufficient to react to any significant degree with the secondary amino groups of the polyalkylene polyamine is used. The organic dicarboxylic acid derivative/polyalkylene polyamine molar ratio is preferably between about 0.9/1.0 to about 1.0/0.9.

"Organic dicarboxylic acid derivatives" includes aliphatic and aromatic dicarboxylic acids and their corresponding acid chlorides, anhydrides and esters, and mixtures thereof. Esters are preferably $C_1$-$C_3$ aliphatic esters. The organic dicarboxylic acid derivatives are selected such that the resulting polyaminoamide is water soluble or water dispersible.

Representative organic dicarboxylic acids and their derivatives include maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl, ethyl adipate dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl) ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthaic anhydride, and the like. DBE-2 dibasic ester, adipic acid, dimethyl glutarate and dimethyl adipate are preferred.

"Polyalkylene polyamines" means those organic compounds having two primary amine (—NH$_2$) groups and at least one secondary amine group where the amino nitrogen atoms are linked together by alkylene groups, provided no two nitrogen atoms are attached to the same carbon atoms. Representative polyalkylene polyamines include diethylenetriamine (DETA), triethylenetetraamine (TETA), tetraethylenepentaamine (TEPA), dipropylenetriamine, and the like. Diethylenetriamine is preferred.

In a preferred aspect of this invention, the organic dicarboxylic acid derivative is DBE-2 dibasic ester and the polyalkylene polyamine is diethylenetriamine.

In another preferred aspect, the organic dicarboxylic acid derivative is adipic acid and the polyalkylene polyamine is diethylenetriamine.

The polyaminoamide prepared as described above is then reacted with epichlorohydrin under controlled conditions to form the polyaminoamide-epichlorohydrin (PAE) resin. Preferably, the polyaminoamide is diluted with water to a concentration of about 10 to about 40 weight percent, and the solution is cooled below about 25° C. An amount of epichlorohydrin sufficient to react with substantially all of the secondary amino groups in the polyaminoamide is then slowly added in the solution so that the temperature is maintained below about 30° C. Typically, about 0.5 to about 1.8, preferably about 1 to about 1.7 molar equivalents of epichlorohydrin, based on secondary amino groups of the polyaminoamide, is sufficient to prepare a resin giving superior wet strength without undue problems with resin stability. The mixture is then heated at a temperature of about 40° C. to about 100° C. until desired viscosity is reached, typically about 4 to about 8 hours.

The polyaminoamide-epichlorohydrin resin solution is then quenched by adding a sufficient amount of a strong acid as defined herein to adjust solution pH to less than about 3.

"Strong acid" means an acid that almost completely dissociates to hydrogen ion and conjugate base in aqueous solution. Strong acids generally have a pKa less than about 2.2, preferably less than or equal to about 0. Representative strong acids include hydrochloric acid, sulfuric acid, phosphoric acid, nitric acid, perchloric acid and methanesulfonic acid. Hydrochloric acid and sulfuric acid are preferred.

Following pH adjustment with the strong acid, a weak acid in a mole ratio of total protons available from the weak acid to total protons available from the strong acid of about 0.05 to about 2, preferably about 0.1 to about 1, is added to the polyaminoamide-epichlorihydrin resin solution to enhance the product stability.

"Weak acid" means an acid that partly dissociates to hydrogen ion and its conjugate base in aqueous solution. Weak acids generally have a pKa greater than or equal to about 2.2. Representative weak acids include acetic acid, formic acid, benzoic acid, propionic acid, citric acid, malonic acid, adipic acid and glycine. Acetic acid, formic acid, benzoic acid and propionic acid are preferred. Acetic acid and formic acid are more preferred.

Accordingly, in a preferred aspect, this invention is a stabilized aqueous polyaminoamide-epichlorohydrin resin solution prepared by
(a) reacting one or more aliphatic or aromatic dicarboxylic acid derivatives with one or more polyalkylene polyamines in a mole ratio of about 0.9:1 to about 1:0.9 to form a polyaminoamide;
(b) reacting an aqueous solution of the polyaminoamide prepared in step (a) with about 0.5 to about 1.8 molar equivalents of epichlorohydrin, based on secondary amino groups of the polyaminoamide, to form an aqueous polyaminoamide-epichlorohydrin resin solution;
(c) adjusting the pH of the aqueous polyaminoamide-epichlorohydrin resin solution to less than about 3 with strong acid; and
(d) adding to the aqueous solution from step (c) a weak acid in a mole ratio of total protons available from the weak acid to total protons available from the strong acid of about 0.05 to about 2 to form the stabilized aqueous polyaminoamide-epichlorohydrin resin solution.

In another preferred aspect, the strong acid is selected from the group consisting of hydrochloric acid, sulfuric acid, nitric acid and perchloric acid and the weak acid is selected from the group consisting of acetic acid, formic acid, benzoic acid and propionic acid.

In another preferred aspect, the strong acid is hydrochloric acid or sulfuric acid and the weak acid is formic acid or acetic acid.

In another preferred aspect, the stabilized aqueous solution comprises about 10 to about 50 weight percent of polyaminoamide-epichlorohydrin resin based on polymer solids.

In another preferred aspect, the stabilized aqueous solution comprises about 25 to about 40 weight percent of polyaminoamide-epichlorohydrin resin based on polymer solids.

The stabilized polyaminoamide-epichlorohydrin resins prepared according to this invention may be incorporated into a papermaking process to enhance the wet strength of the paper prepared according to the process. As used herein "papermaking process" means a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art.

The stabilized aqueous polyaminoamide-epichlorohydrin resin may be incorporated into the papermaking furnish at any point on the wet end of the paper machine. They may also be applied from a tub size or at a size press or from showers to the dried or partially dried sheet. For most purposes, adequate wet strength may be obtained by incorporating in the paper from about 0.10 to about 3 weight percent of the resin, based on the dry weight of the pulp. However, in special cases, up to 5 weight percent or more of the resin may be used.

Accordingly, in another aspect, this invention is a method of enhancing the wet strength of paper comprising adding to a papermaking furnish or paper sheet an effective wet strength enhancing amount of a stabilized aqueous solution of polyaminoamide-epichlorohydrin resin, wherein the aqueous solution is stabilized by adjusting the pH of the solution to less than about 3 with strong acid and then adding to the solution weak acid in a mole ratio of total protons available from the weak acid to total protons available from the strong acid of about 0.05 to about 2.

The foregoing may be better understood by reference to the following examples, which are presented for purposes of illustration and are not intended to limit the scope of this invention.

EXAMPLE 1

To a 2000 ml reaction flask is charged 412.68 g of diethylenetriamine. The reactor is purged with nitrogen and the solution is heated to 150° C. and 654.12 g of DBE-2 (dibasic ester-2 from E.I. DuPont de Nemours and Company, Wilmington, Del.) is charged into the reactor over one hour while the temperature is maintained. Methanol begins to evolve after DBE-2 addition is started. The methanol is refluxed through a condenser. The reaction temperature begins to drop once methanol is formed. Reflux is maintained for half an hour after the completion of DBE-2 addition and then methanol is removed by distillation. The reaction temperature rises to 150° C. The reaction temperature is maintained at 150° C. for 5 hours. Water (810.7 g) is then slowly added into the reactor with stirring to provide a 50% polyaminoamide polymer solution.

EXAMPLE 2

To a 1000 ml reaction flask is charged 204.3 g of diethylenetriamine. The reactor is purged with nitrogen and 50 g of water, 4.0 g of sulfuric acid and 295.2 g of adipic acid are charged into the reactor while the mixture is heated to 165° C. Water is collected through a condenser. The reaction mixture is maintained at 165° C. for 5 hours. Optional vacuum is applied to increase polymer molecular weight. Water (423.5 g) is then slowly added into the reactor with stirring to provide a 50% polyaminoamide polymer solution.

EXAMPLE 3

To a 1500 ml reaction flask is charged 475.95 g the 50% aqueous polyaminoamide solution prepared in Example 2, and 362.72 g of water. The solution is mixed well and purged with nitrogen. The solution is cooled down to 15° C. and 162.48 g of epichlorohydrin is added into the reactor over one hour. The temperature is controlled below 20° C. After completion of epichlorohydrin addition, the reaction is allowed to proceed adiabatically for two hours. The reaction mixture is then heated to 45° C. and maintained at 45° C. for 4-8 hours. The reaction is quenched with about 26.4 g of sulfuric acid to bring the pH to about 2.1-2.5. About 12.0 g acetic acid (1.0% based on product) and 160 g water are added to make a final product with 34-36% polymer solids.

EXAMPLE 4

Wet strength resin samples (ca. 200 g) are placed in 8-oz jars supplied with lids. The samples are aged in a mechanical convection oven thermostated at 40° C. The bulk viscosity of the samples is monitored during aging time. The viscosity is measured using a Brookfield viscometer, LVT model, at 23° C. using a spindle #2 at 30 rpm. A plot of bulk viscosity vs. days at 40° C. for a representative stabilized polyaminoamide-epichlorohydrin resin prepared according to the method of this invention and an unstabilized sample is shown in FIG. 1. As shown in FIG. 1, there is virtually no viscosity build up in the stabilized sample upon extended storage at 40° C. while the unstabilized sample degrades within about 10 days.

Changes can be made in the composition, operation and arrangement of the method of the invention described herein without departing from the concept and scope of the invention as defined in the claims.

The invention claimed is:

1. A method of stabilizing an aqueous solution of polyaminoamide-epichlorohydrin resin comprising
    (a) providing an aqueous polyaminoamide-epichlorohydrin resin solution; and sequentially
    (b) adjusting the pH of the solution prepared in step (a) to less than about 3 with strong acid; and
    (c) adding weak acid to the solution prepared in step (b) in a mole ratio of total protons available from the weak acid to total protons available from the strong acid of about 0.05 to about 2.

2. The method of claim 1 wherein the strong acid is selected from the group consisting of hydrochloric acid, sulfuric acid, phosphoric acid, nitric acid, perchloric acid and methanesulfonic acid.

3. The method of claim 1 wherein the weak acid is selected from the group consisting of acetic acid, formic acid, benzoic acid, propionic acid, citric acid, malonic acid, adipic acid and glycine.

4. The method of claim 1 wherein the stabilized aqueous solution comprises about 10 to about 50 weight percent of polyaminoamide-epichlorohydrin resin based on polymer solids.

5. The method of claim 1 wherein the strong acid is selected from the group consisting of hydrochloric acid, sulfuric acid, nitric acid and perchloric acid and and the weak acid is selected from the group consisting of acetic acid, formic acid, benzoic acid and propionic acid.

6. The method of claim 5 wherein the mole ratio of total protons available from the weak acid to total protons available from the strong acid of about 0.1 to about 1.

7. The method of claim 6 wherein the stabilized aqueous solution comprises about 25 to about 40 weight percent of polyaminoamide-epichlorohydrin resin based on polymer solids.

8. The method of claim 7 wherein the strong acid is hydrochloric acid or sulfuric acid and the weak acid is formic acid or acetic acid.

9. The method of claim 1 wherein the polyaminoamide-epichlorohydrin resin is prepared by reacting a polyaminoamide with about 0.5 to about 1.8 molar equivalents of epichlorohydrin, based on secondary amino groups of the polyaminoamide.

10. The method of claim 9 wherein the polyaminoamide-epichlorohydrin resin is prepared by reacting a polyaminoamide with about 1 to about 1.7 molar equivalents of epichlorohydrin, based on secondary amino groups of the polyaminoamide.

11. The method of claim 9 wherein the polyaminoamide is prepared by reacting one or more aliphatic or aromatic dicarboxylic acid derivatives with one or more polyalkylene polyamines in a mole ratio of about 0.9:1 to about 1:0.9.

12. The method of claim 11 wherein the dicarboxylic acid derivative is selected from DBE-2 dibasic ester, adipic acid, dimethyl glutarate and dimethyl adipate.

13. The method of claim 11 wherein the polyalkylene polyamine is diethylenetriamine.

14. The method of claim 11 wherein the dicarboxylic acid derivative is DBE-2 dibasic ester and the polyalkylene polyamine is diethylenetriamine.

15. The method of claim 11 wherein the dicarboxylic acid derivative is adipic acid and the polyalkylene polyamine is diethylenetriamine.

16. A stabilized aqueous polyaminoamide-epichlorohydrin resin solution prepared according to the method of claim 1.

17. A stabilized aqueous polyaminoamide-epichlorohydrin resin solution prepared by sequentially (a) reacting one or more aliphatic or aromatic dicarboxylic acid derivatives with one or more polyalkylene polyamines in a mole ratio of about 0.9:1 to about 1:0.9 to form a polyaminoamide;

(b) reacting an aqueous solution of the polyaminoamide prepared in step (a) with about 0.5 to about 1.8 molar equivalents of epichlorohydrin, based on secondary amino groups of the polyaminoamide, to form an aqueous polyaminoamide-epichlorohydrin resin solution;

(c) adjusting the pH of the aqueous polyaminoamide-epichlorohydrin resin solution to less than about 3 with strong acid; and (d) adding to the aqueous solution from step (c) a weak acid in a mole ratio of total protons available from the weak acid to total protons available from the strong acid of about 0.05 to about 2 to form the stabilized aqueous polyaminoamide-epichlorohydrin resin solution.

18. A method of enhancing the wet strength of paper comprising adding to a papermaking furnish or paper sheet an effective wet strength enhancing amount of a stabilized aqueous solution of polyaminoamide-epichlorohydrin resin prepared according to the method of claim 1.

* * * * *